INVENTOR.
Charles Blickenderfer Jr.
BY
Cook and Schermerhorn
ATTORNEYS

Jan. 17, 1956
C. BLICKENDERFER, JR
2,731,130
FEED MECHANISM FOR LUMBER CONVEYOR
Filed June 13, 1950
4 Sheets-Sheet 2
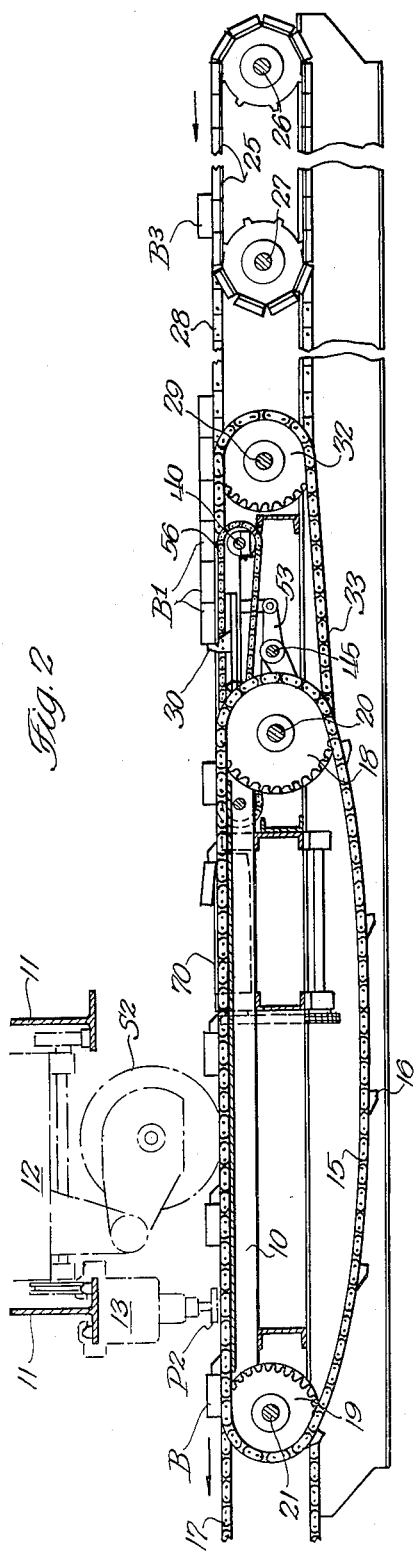
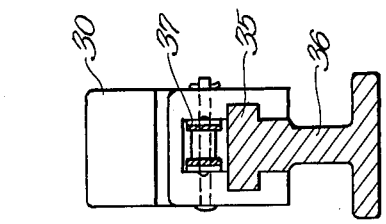
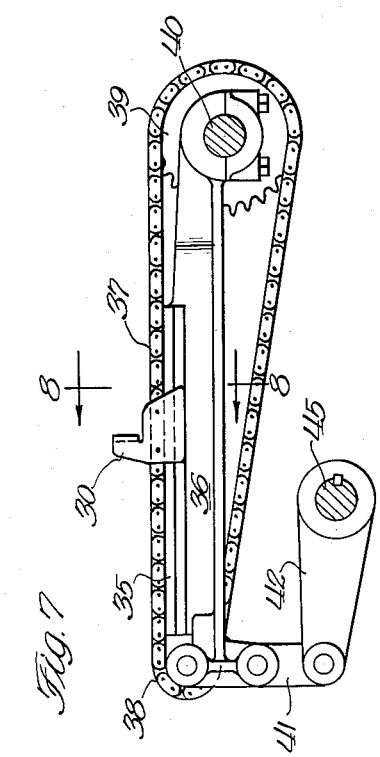
INVENTOR.
Charles Blickenderfer Jr.
BY
Cook and Schermerhorn
ATTORNEYS Jan. 17, 1956     C. BLICKENDERFER, JR     2,731,130
FEED MECHANISM FOR LUMBER CONVEYOR
Filed June 13, 1950     4 Sheets-Sheet 3
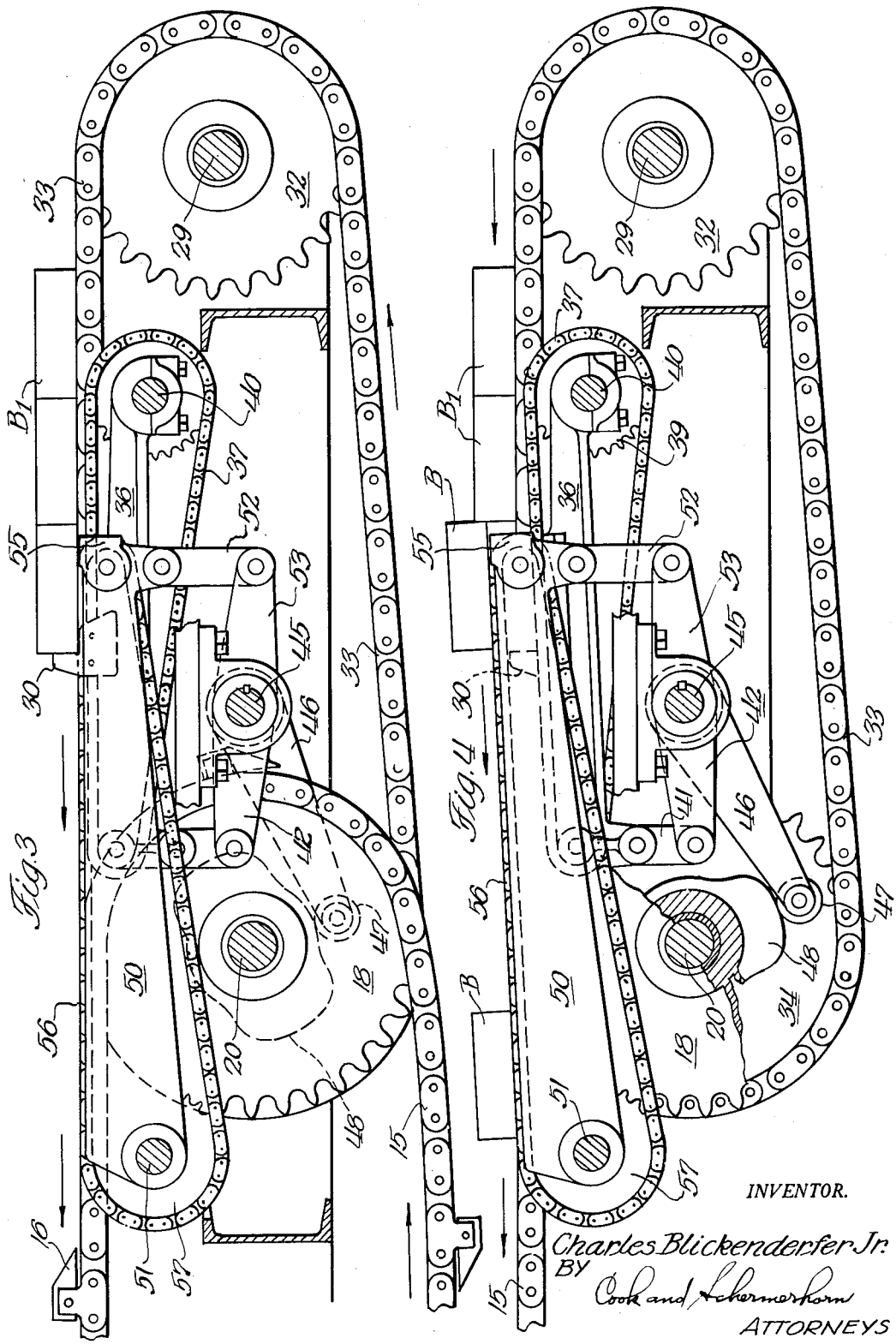
INVENTOR.
Charles Blickenderfer Jr.
BY
Cook and Schermerhorn
ATTORNEYS Jan. 17, 1956  C. BLICKENDERFER, JR  2,731,130
FEED MECHANISM FOR LUMBER CONVEYOR
Filed June 13, 1950  4 Sheets-Sheet 4
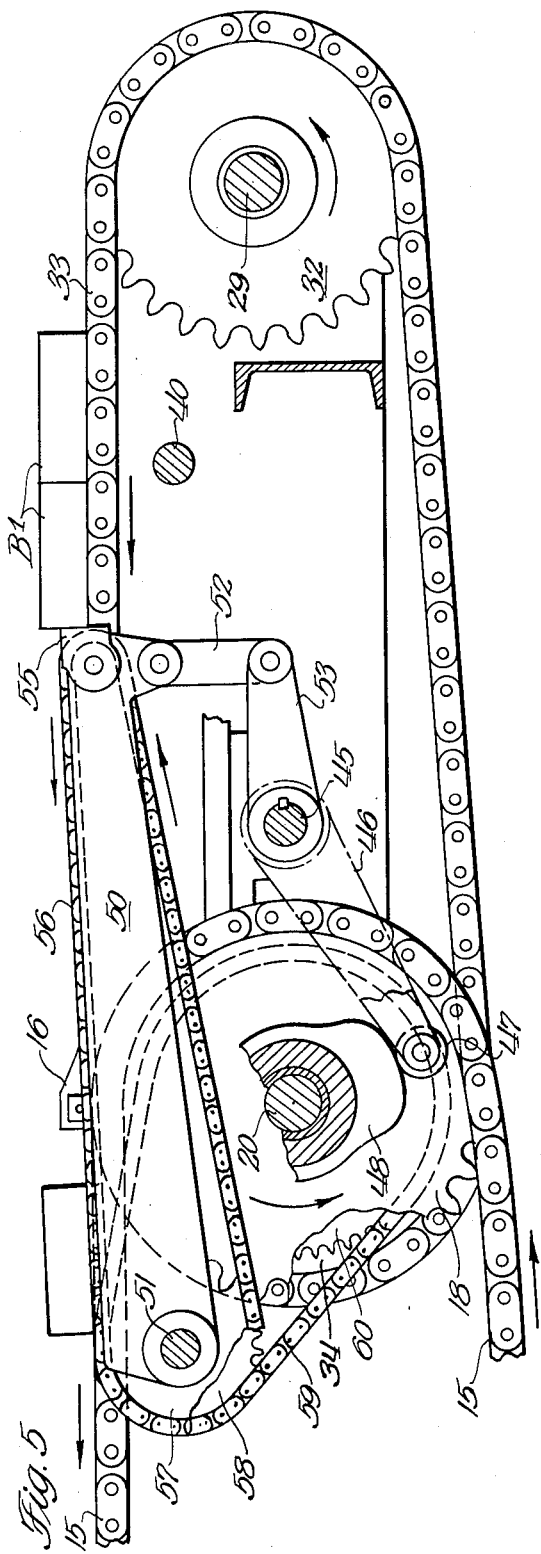
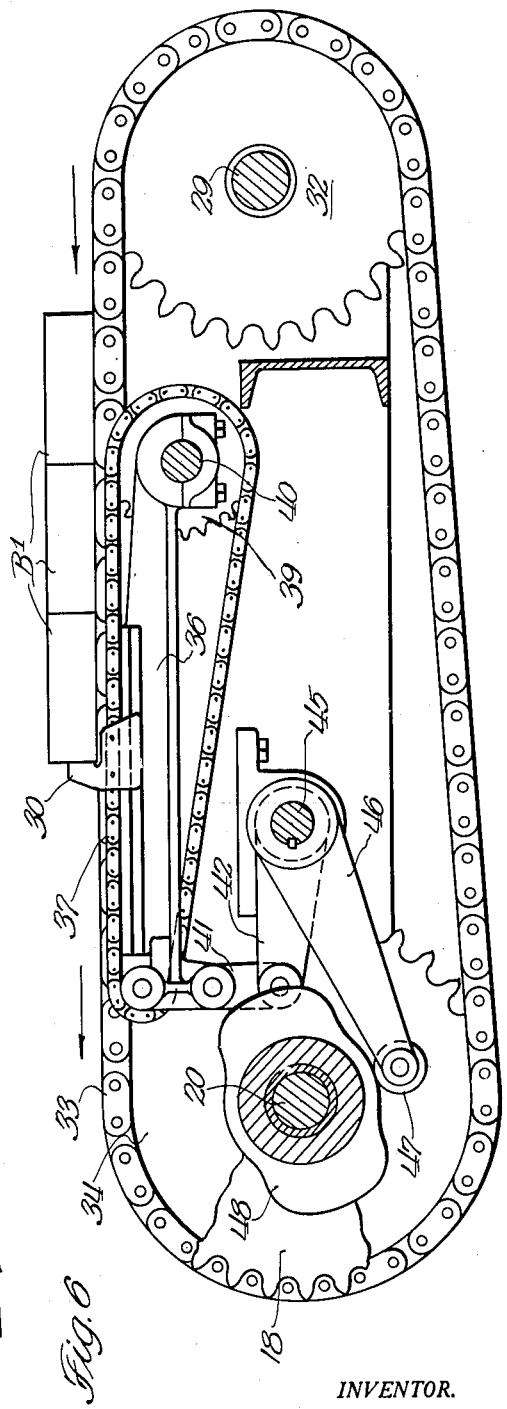
INVENTOR.
Charles Blickenderfer Jr.
BY
Cook and Schermerhorn
ATTORNEYS United States Patent Office 2,731,130
Patented Jan. 17, 1956

2,731,130

FEED MECHANISM FOR LUMBER CONVEYOR

Charles Blickenderfer, Jr., Puyallup, Wash., assignor to Weyerhaeuser Timber Company, Tacoma, Wash., a corporation of Washington Application June 13, 1950, Serial No. 167,877

12 Claims. (Cl. 198—34)

This invention relates to a feed mechanism for a lumber conveyor. The construction and operation of the feed mechanism are illustrated in connection with the conveyor of an improved lumber trimming machine of the general type illustrated in the patent to A. H. Onstad, No. 1,894,415.

In this type of lumber trimming machine, pieces of lumber, such as boards, are conveyed in spaced relation in edgewise movement between a pair of circular saws which are spaced apart a precise distance to trim the lumber to certain standard lengths and make both ends square and true. In the patent referred to, the lumber to be trimmed is stacked in a magazine from which it is removed piece by piece from the bottom of the stack by upstanding lugs on a main feed conveyor traveling under the stack. Various adjustments are required for the feed magazine in order to handle boards of different width and thickness, and jogging mechanism is necessary to prevent the boards from cocking and sticking in the magazine. Such adjustments are difficult if not impossible to make when the magazine is piled full of boards. The jogging mechanism is not entirely effective and when boards jam in the magazine considerable effort is required to straighten them out. Another disadvantage of the magazine, or hopper, type of feed mechanism is that for the best operation the magazine should never be entirely depleted of boards. When the pile is reduced to one board, the main conveyor chains are stopped for a time to build up a pile in the magazine of sufficient size to run the machine for some time, or else automatic control mechanism is provided to slow down the main conveyor chains as the supply in the magazine becomes depleted.

The general object of the present invention is to provide an improved feed mechanism for lumber, and particularly for lumber trimming machines of the type described to overcome the difficulties and shortcomings of the feed magazine disclosed in the Onstad patent. Particular objects are to provide a feed mechanism having fewer and simpler adjustments to accommodate boards of different width and thickness, to provide a feed mechanism which does not require a jogging device to bump the boards into flat positions, to provide a feed mechanism which is not affected by the depletion of the supply of boards, and to provide a feed mechanism which does not require stopping or altering the speed of the main conveyor of the machine at frequent times when the delivery rate to the machine is varied. A further object is to provide an intermittent escapement type of feed mechanism in which the boards waiting to be trimmed are accumulated or backed up in a horizontal layer one board thick instead of in a vertical pile.

In the present construction, instead of piling the boards to be trimmed in a magazine, they are held back in a single layer behind retractable stops which hold them in readiness to advance into the machine one at a time at the proper intervals. A crowding conveyor holds a supply of boards against the stops, and when it is time for the next board to advance into the machine, first one and then the other of the stops is momentarily withdrawn, allowing the whole layer to move forward. Only the first board can advance and be picked up by the spaced lugs on the main conveyor chains. Sets of front and rear stops less than a board width apart alternately rise and fall to operate as an intermittent escapement mechanism for feeding one board at a time each time a set of lugs on the main conveyors approaches the position to pick up a new board. Adjustment for boards of different width is easily made, and no adjustment is necessary for boards of different thickness.

The foregoing and other objects will become apparent and the invention will be better understood with reference to the preferred embodiment and application described in the following specification and illustrated on the accompanying drawings. It is to be understood, however, that various changes may be made in the construction and arrangement of parts, and that certain features may be used without others without departing from the spirit of the invention. Although the feed mechanism is illustrated in connection with a particular lumber treating machine, the invention is intended to be of general application.

In the drawings:

Figure 2 is a longitudinal sectional view through the machine taken on the offset line 2—2 of Figure 1;

Figure 3 is a sectional view taken on the line 3—3 of Figure 1, showing the parts in one position;

Figure 4 is a view similar to Figure 3 showing the parts in a different position;

Figure 5 is a sectional view similar to Figure 4 with certain parts omitted;

Figure 6 is a view taken on the line 6—6 of Figure 1 to show certain parts of Figure 3 which were omitted in Figure 5;

Figure 7 (sheet 2) is a view similar to Figure 6 but with still other parts omitted to show the arrangement of the adjustable stop for the feed mechanism; and Figure 8 is a cross sectional view taken on the line 8—8 of Figure 7.

Figure 1:
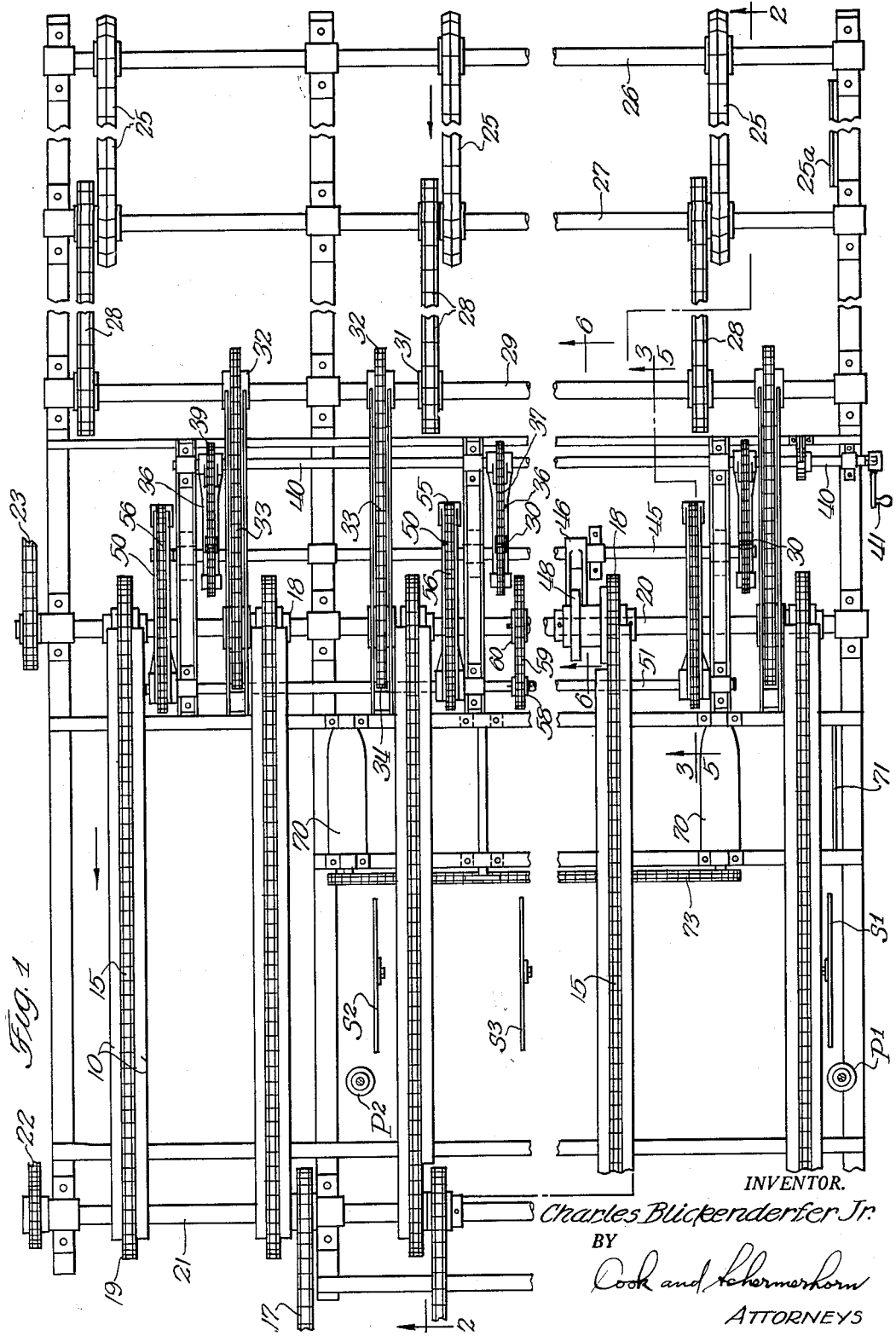
Figure 1 is a general plan view of the whole conveyor system in the lower frame of the improved trimming machine, illustrating the present feed mechanism.

Referring first to the general views in Figures 1 and 2, the trimming machine has a lower frame at the working level comprising longitudinal beams 10 which form skids for the pieces of lumber or boards designated generally as B. Above the lower frame is an upper frame comprising a pair of transverse beams 11 to carry the saw carriage 12 and end printer carriage 13. The saws and printers are indicated by the characters S and P with subscripts. The saw $S_1$ and printer $P_1$ are carried by stationary saw and printer supports at one side of the machine. The other printer $P_2$ and the two saws $S_2$ and $S_3$ are carried by the movable carriages 13 and 12 which can be traversed across the machine to cut lumber in a variety of standard lengths.

The purpose of the whole conveyor system of the machine is to feed the pieces of lumber or boards B in edgewise movement between the saws and printers to trim and mark the ends. It may be explained at this point that the saw $S_3$ is normally raised to inoperative position when the lumber is long enough to reach saw $S_2$, and that the lumber is normally trimmed by being passed between the saws $S_1$ and $S_2$, after which the freshly cut ends are marked by the printers $P_1$ and $P_2$. The purpose of saw $S_3$ and the device for raising this saw are immaterial to the present invention.

Thus, the lumber is moved between the saws and printers by a series of parallel longitudinal main conveyor chains 15 having aligned flight lugs 16 to engage and move the boards on the skids 10. After treatment in the present machine, the boards are removed and carried to some further operation on conveyor 17. The conveyor chains 15 run on sprockets 18 and 19 on transverse shafts 20 and 21. Sprockets 19 are keyed to shaft 21 which is driven by a chain 22 from a suitable source of power. Sprockets 18 turn loosely on shaft 20.

The present invention is concerned with that part of the apparatus generally referred to as the feed mechanism which holds a supply of boards in readiness at the position indicated by the boards $B_1$. The feed mechanism releases the boards one at a time as the aligned lugs 16 present themselves to receive the boards.

Pieces of lumber are ordinarily delivered to an end trimmer of the present type in longitudinal movement as from a planer or belt conveyor. In Figure 2 the board at $B_3$ is being received on the transfer conveyor 25, the movement of the board being relatively fast in a lengthwise direction perpendicular to the plane of the view. Its longitudinal motion is halted by a stop $25a$ (Fig. 1) which is slightly offset from the stationary saw $S_1$. The chains of conveyor 25 are equipped with special peaked links which permit the boards to slide across the chains quite freely until they encounter the stop $25a$ and come to rest on the chains. These chains carry the boards, one at a time as they are received, in edgewise movement to a series of smooth storage chains 28, which may be made as long as necessary to hold a sufficient supply of boards at $B_1$.

The chains 25 are mounted on suitable sprockets on a pair of shafts 26 and 27. The chains 28 run on sprockets on shafts 27 and 29, and slide under the boards at $B_1$ to crowd them together and against a row of aligned rear stops 30, in one position of the feed mechanism, as will be presently explained in detail. Shaft 29 carries sprockets 31 for the chains 28 and sprockets 32 for another set of crowding chains 33. Shaft 20, in addition to the loose sprockets 18 for the main conveyor chains 15, carries keyed sprockets 34 for driving the chains 33. The conveyors 25, 28 and 33 are all driven in series from the shaft 20 which in turn is driven by a chain 23 from a variable speed source of power.

Referring now to Figures 7 and 8, each rear stop 30 is mounted to slide some distance back and forth on a rail 35 on a stop arm 36 pivotally supported at one end on a shaft 40. The stop 30 is attached to an endless chain 37 trained around sprockets 38 and 39 at the opposite ends of the stop arm. The sprocket 39 for each stop arm is keyed to shaft 40 which has one end extending from one side of the machine, as shown in Figure 1, for adjustment by a crank or hand wheel 41. The several stop arms 36 are mounted loosely on shaft 40 with the outer end of each arm extending rearwardly and supported by a link 41 pivotally connected with a rocker arm 42 on a rocker shaft 45.

In Figure 6 it will be seen that the rocker shaft 45 is actuated by a cam follower arm 46 having a cam follower 47 riding on a double lobed cam 48 on the shaft 20. Cam 48 is integral with one of the sprockets 18, which is loose on shaft 20, so that the stop 30 is depressed by the action of cam 48 twice in each rotation of sprocket 18. Hence the rocker shaft 45 is controlled exclusively by the main conveyor 15 and is not affected by the more adjacent conveyor 33. In a typical installation the sprockets 18 have 32 teeth and the lugs 16 are placed on every 16th link of chains 15 to bring the lugs always in the same position relative to a cam lobe. The spacing of the lugs is also approximately equal to the distance from the center of the saw to the center of the printer.

Also actuated by the rocker shaft 45 and cam 48 are a series of lifting arms 50, best shown in Figure 5. Each arm 50 is pivotally mounted loosely on a shaft 51 and has a movable forwardly extending end supported by a link 52 on a rocker arm 53 keyed on the rocker shaft 45. Hence, the arms 50 are raised by the action of the cam lobes 48 twice in each rotation of the sprocket 18 at the same time that stops 30 are depressed, the rocker arms 42 and 53 being disposed at an angle of 180 degrees on the rocker shaft 45.

The movable end of each arm 50 forms a front stop 55 to engage and hold back the boards at $B_1$ while the stop 30 is lowered. An auxiliary conveyor chain 56 is trained around each arm 50 on end sprockets with the top reach of the chain slightly above the level of the arm to support and move lumber over rear stop 30 when the arm is raised. This chain is driven by a sprocket 57 keyed to the shaft 51 which also carries a sprocket 58 having a chain 59 driven by a sprocket 60 on the drive shaft 20.

Longitudinal rolls 70 (Figs. 1 and 2) crowd the boards on the main conveyor 15 against a stop guide 71 as they approach the trimming saws. These rolls are elevated slightly above the level of skids 10 and are driven by a chain 73 from a suitable source of power, not shown.

*Operation*

The intermittent, single board feed action of the present mechanism will be best understood with reference to Figures 3 and 4 which show the cam 48 in two different positions. If boards are delivered to the transfer conveyor 25 in approximately the same number per minute that are picked up by the lugs 16 on the main conveyor chains 15, there will always be a waiting supply crowded together at $B_1$ in edge abutting relation in a single layer, as shown in Figures 2 and 3.

Twice in each revolution of sprocket 18 a row of lugs 16 presents itself in position to pick up a board about to leave the chains 33 and 56. The chain 15 is timed in relation to the position of cam 48 so that a lug 16 is approaching lumber engaging position just as one of the lobes of cam 48 depresses the cam follower 47 to lower the rear stop 30. Then, just as rear stop 30 is lowered by rocker arm 42 to release the board which is bearing against this stop, the front stop 55 is raised by rocker arm 53 to lift the first board clear of stop 30 and intercept the second board, as illustrated in Figure 4. Chains 56 carry the first board along the arm 50 over stop 30 to the main conveyor chains 15 just ahead of the approaching lug 16, as best shown in Figure 5. When the board encounters the resistance of skids 10 and rollers 70, it is straightened up by the aligned lugs 16 so that it will lie perpendicular to the chains as it reaches the trimming saws. The crowding rollers 70 move the board endwise against guide stop 71 at the same time.

As long as cam follower 47 is held depressed by a cam lobe 48, the remaining supply of boards at $B_1$ are held back by the elevated front stop 55. When the cam lobe passes beyond the cam follower, front stop 55 drops down below the level of chains 33 and rear stop 30 rises to its original position shown in Figures 3 and 6. Chains 33 and 28 then advance all the boards at $B_1$ and hold them against stops 30 until the next cam lobe 48 engages the follower 47.

Thus it will be appreciated that the present feed mechanism operates to hold a supply of boards in parallel edge abutting relation in a single layer, regardless of the speed or slowness with which they are received, within the capacity of the machine, and no jogging mechanism is necessary to bump or jostle them into an even, orderly arrangement. Inasmuch as the boards are not piled one upon another, it is immaterial to the action of the feeding mechanism if some of the boards are considerably thicker or thinner than others.

Small variations in width of the boards do not affect the operation of the feed mechanism, but boards varying greatly in width should not be intermixed. The stops 30 are readily adjusted by turning shaft 40 to move them through a wide range to handle any intermediate size between very narrow and very wide boards. It will be apparent from Figure 4 that this adjustment is not critical, because the boards at $B_1$ move up in two steps in each feed cycle.

If the boards should become disarranged in any manner, there is ample time for an attendant to straighten them out on the chains 28 and 33 before they reach the chains 15, and there is no weight of overlying boards to interfere with his efforts. This is of particular advantage where the boards are long or heavy and, in any event, it reduces the exertion and fatigue of the attendant and facilitates higher speed operation.

Having now described my invention and in what manner the same may be used, what I claim as new and desire to protect by Letters Patent is:

1. An intermittent feed mechanism for a conveyor comprising a first pivotally mounted stop arm having a movable end extending in the direction of travel of said conveyor, a second pivotally mounted stop arm having a movable end extending in the opposite direction at the side of said first arm, a rear stop on said first arm, a front stop on said second arm, a cam actuated rocker shaft, oppositely directed rocker arms on said rocker shaft supporting the movable ends of said stop arms for raising and lowering said arms in alternate relation, and auxiliary conveyor means on said second stop arm movable to positions below and above said rear stop by the movements of said stop arms.

2. In a lumber conveyor and the like, a lug conveyor comprising a horizontal chain having longitudinally spaced lugs for pushing boards in spaced relation in edgewise movement, a crowding conveyor delivering boards to said lug conveyor, front and rear stops for holding back a plurality of boards in edge abutting relation on said crowding conveyor, means for adjusting said stops to longitudinal positions less than a board width apart, means for raising and lowering said stops alternately to release one board at a time, auxiliary conveyor means movable vertically in unison with said front stop extending between said stops and overlapping a portion of said lug conveyor to carry a board over said rear stop to said lug conveyor when said front stop is raised, and means controlled by said lug conveyor for operating said stop raising and lowering means in timed relation with said lug conveyor to deliver a board in front of each lug.

3. In a lumber conveyor and the like, a lug conveyor comprising a horizontal chain trained around a sprocket wheel and having longitudinally spaced lugs for pushing boards in spaced relation in edgewise movement, a crowding conveyor delivering boards to said lug conveyor, front and rear stops for holding back a plurality of boards in edge abutting relation on said crowding conveyor, a rocker shaft for raising and lowering said stops alternately to release one board at a time, auxiliary conveyor means on said front stop to carry boards over said rear stop when said front stop is raised, said auxiliary conveyor means and said lug conveyor having overlapping portions to transfer boards from the auxiliary conveyor means to the lug conveyor, and a cam operably connected with said sprocket wheel for actuating said rocker shaft in timed relation with said lug conveyor to deliver one board on said auxiliary conveyor means ahead of each lug on said lug conveyor.

4. In a lumber conveyor and the like, a lug conveyor comprising a horizontal chain trained around a sprocket wheel and having longitudinally spaced lugs for pushing boards in spaced relation in edgewise movement, a crowding conveyor arranged to deliver boards to said lug conveyor, front and rear stops for holding back a plurality of boards in edge abutting relation on said crowding conveyor, means for raising and lowering said stops alternately to release one board at a time, auxiliary conveyor means on said front stop having one end portion overlapping said crowding conveyor and its other end portion overlapping said lug conveyor, said auxiliary conveyor means being arranged to carry boards over said rear stop when said front stop is raised, and means operably connected with said sprocket wheel for actuating said stop raising and lowering means in timed relation with said lug conveyor to deliver one board on said auxiliary conveyor means ahead of each lug on said lug conveyor.

5. In a lumber conveyor and the like, a lug conveyor having longitudinally spaced lugs for pushing boards in spaced relation in edgewise movement, a crowding conveyor arranged to deliver boards to said lug conveyor, front and rear stops longitudinally spaced less than a board width apart for holding back a plurality of boards in edge abutting relation on said crowding conveyor, means for raising and lowering said stops alternately to release one board at a time from said crowding conveyor, an auxiliary conveyor chain mounted for vertical movement in unison with said front stop to carry boards over said rear stop when said front stop is raised, said auxiliary conveyor chain having one end overlapping said crowding conveyor and its other end overlapping said lug conveyor, means connected with one of said conveyors for driving said auxiliary conveyor chain, and means operably connected with said lug conveyor for actuating said stop raising and lowering means in timed relation with said lug conveyor to release one board on said auxiliary conveyor chain ahead of each lug on said lug conveyor.

6. In a lumber conveyor and the like, a lug conveyor comprising a horizontal chain trained around a sprocket wheel and having longitudinally spaced lugs for pushing boards in spaced relation in edgewise movement, a crowding conveyor for delivering boards to said lug conveyor, an arm pivotally mounted at one end and having a vertically movable end extending in the direction of travel of said crowding conveyor, a longitudinally adjustable board stop on said arm, a second arm having one end pivotally mounted in overlapping relation with said lug conveyor and having a vertically movable end extending into overlapping relation with said crowding conveyor and said first arm, a board stop on said movable end of said second arm, auxiliary conveyor means on said second arm, and means operably connected with said lug conveyor for raising and lowering said arms and their respective board stops in alternate relation to hold back a plurality of boards in edge abutting relation on said crowding conveyor and release one board at a time ahead of each lug on said lug conveyor, said auxiliary conveyor means carrying boards over said stop on said first arm when said first arm is lowered and said second arm is raised.

7. In a lumber trimming machine and the like, a main conveyor equipped with lugs for carrying boards in spaced relation in edgewise movement, a shaft having a sprocket wheel for said main conveyor, said sprocket wheel having a pitch circle circumference equal to an integer multiple of the lug spacing on said conveyor, a rock shaft having a cam follower arm adjacent said sprocket wheel, a cam on said sprocket wheel for actuating said cam follower arm when the lugs on said conveyor pass a predetermined position, a stop arm having a movable end extending in the direction of travel of said conveyor, a rear stop on said arm, a stop arm having a movable end extending in the opposite direction, a front stop on said last arm, oppositely directed rocker arms on said rock shaft connected with said stop arms for raising and lowering said stop arms in alternate relation, and a conveyor for crowding a plurality of boards in edge abutting relation toward said main conveyor and against said front stop when said front stop is raised and against said rear stop when said rear stop is raised, for release of a single board when said rear stop is lowered.

8. An intermittent feed mechanism for a lumber conveyor and the like comprising parallel chains for carrying boards in edgewise movement, front and rear stops between said chains longitudinally spaced less than a board width apart, a rocker shaft for raising said stops alternately into stopping position to stop the movement of the boards and hold back a plurality of boards in edge abutting relation on the moving chains, an auxiliary conveyor chain on said front stop to carry boards over said rear stop when the front stop is raised, a shaft having sprockets for driving said parallel chains, and a drive sprocket on said shaft for said auxiliary conveyor chain.

9. In a lumber trimming machine and the like, a main conveyor equipped with lugs for carrying boards in spaced relation in edgewise movement, means for driving said conveyor, a crowding conveyor delivering boards to said main conveyor, a conveyor shaft having sprockets keyed thereto for driving said crowding conveyor, means for driving said shaft, loose sprockets on said shaft for said main conveyor, front and rear stops for holding back a plurality of boards in edge abutting relation on said crowding conveyor, a rocker shaft for raising and lowering said stops alternately to release one board at a time, an auxiliary conveyor on each of said front stops to carry a board over said rear stops when the front stops are raised, sprockets keyed to said conveyor shaft for driving said auxiliary conveyors, and a cam integral with one of said loose sprockets for actuating said rocker shaft in timed relation with said main conveyor.

10. In a lumber conveyor and the like, horizontal supporting chains arranged to carry boards in edgewise feed movement, a stop arm pivotally mounted below said chains for vertical movement and extending in the direction of said feed movement, a stop arm pivotally mounted below said chains for vertical movement and extending in the opposite direction and overlapping said first arm, a board stop member on each arm, means for raising and lowering said arms in alternate movement to project and withdraw said stop members, one of said stop members being mounted for longitudinal sliding movement on its said stop arm, sprocket wheels mounted for rotation on the ends of said arm, and an endless chain on said sprocket wheels connected with said one stop member for adjusting the position of said one stop member along its said arm relative to the stop member on the other arm.

11. In a lumber conveyor and the like, horizontal supporting chains arranged to carry boards in edgewise feed movement, an arm extending parallel with said chains and mounted for vertical pivotal movement on a transverse shaft below said chains, a board stop mounted for longitudinal sliding movement on said arm, means for raising and lowering said arm to project and withdraw said stop member, sprocket wheels mounted for rotation on the ends of said arm, one of said sprocket wheels being connected with said shaft, and an endless chain on said sprocket wheels connected with said stop member for adjusting the position of said stop member along said arm.

12. In a lumber conveyor and the like, horizontal supporting chains arranged to carry boards in edgewise movement, a transverse shaft below said chains, an arm extending parallel with said chains and loosely mounted on said shaft for vertical pivotal movement, a board stop mounted for longitudinal movement on said arm, means for raising and lowering said arm to project and withdraw said stop member, means operable by rotation of said shaft to move said stop member along said arm, and means for rotating said shaft to adjust said stop member.

References Cited in the file of this patent
UNITED STATES PATENTS

| Number | Name | Date |
|---|---|---|
| 845,152 | Weir | Feb. 26, 1907 |
| 1,021,876 | Lister | Apr. 2, 1912 |
| 1,454,992 | Willette | May 15, 1923 |
| 1,557,765 | Nicholas | Oct. 20, 1925 |
| 1,588,821 | Stebler et al. | June 15, 1926 |
| 1,633,014 | Harber | June 21, 1927 |
| 1,894,415 | Onstad | Jan. 17, 1933 |
| 2,184,905 | Brintnall | Dec. 26, 1939 |
| 2,403,673 | Mead | July 9, 1946 |